United States Patent [19]
Araki et al.

[11] 3,958,072
[45] May 18, 1976

[54] CURED POLYESTER PRODUCT

[75] Inventors: Kunio Araki; Kazuo Gotoh; Takashi Sasaki, all of Takasaki, Japan

[73] Assignee: Japan Atomic Energy Research Institute, Tokyo, Japan

[22] Filed: Jan. 3, 1973

[21] Appl. No.: 320,741

[52] U.S. Cl. .................................. 428/414; 156/3; 156/4; 156/272; 156/313; 156/330; 156/332; 428/482
[51] Int. Cl.² .................. B32B 31/06; B32B 31/12; B32B 31/28; B32B 27/36
[58] Field of Search ............ 161/184, 231; 260/867; 156/3, 4, 313, 272, 330, 332, 305; 428/414, 420, 482, 480

[56] References Cited
UNITED STATES PATENTS

| | | | |
|---|---|---|---|
| 3,210,441 | 10/1965 | Dowling | 260/867 |
| 3,225,115 | 12/1965 | McGary et al. | 260/867 X |
| 3,231,586 | 1/1966 | Tinsley | 260/867 X |
| 3,284,277 | 11/1966 | Bonacci et al. | 428/420 |
| 3,291,860 | 12/1966 | Nordstrom | 260/867 X |
| 3,383,372 | 5/1968 | Spivey | 161/218 X |
| 3,399,248 | 8/1968 | Wolinski | 428/414 |
| 3,508,951 | 4/1970 | Shimp et al. | 428/414 |
| 3,551,235 | 12/1970 | Bassemir et al. | 161/184 X |
| 3,558,387 | 1/1971 | Bassemir et al. | 161/184 X |
| 3,640,968 | 2/1972 | Raymond | 161/218 X |
| 3,641,201 | 2/1972 | Heilman | 260/867 |
| 3,666,591 | 5/1972 | Hall | 156/332 X |
| 3,843,481 | 12/1974 | Hoheisel | 161/231 X |

*Primary Examiner*—Harold Ansher
*Attorney, Agent, or Firm*—Browdy and Neimark

[57] ABSTRACT

A cured polyester resin product is obtained by curing a substrate which was treated with a liquid unsaturated polyester resin composition containing an ethylenically unsaturated monomer having at least one epoxy group and was covered with a saturated polyester resin film, the surface of the polyester film having been activated. The cured product has improved resistance to chemicals and weathering and the like.

11 Claims, No Drawings

CURED POLYESTER PRODUCT

DESCRIPTION OF THE PRIOR ART

This invention relates to a novel process for curing a curable material comprising an ethylenically unsaturated polyester resin composition and a substrate, and the resulting cured product, in which the chemical-resistance and weathering properties and the like are remarkably improved.

An unsaturated polyester resin has been employed to produce a fiber-reinforced plastic (FRP), a decorative plate, a coated plate, a wood-polymer composite and the like. However, it is required to conduct the curing in the absence of or by isolating air since oxygen interferes with the polymerization reaction. Therefore, the method for curing has been employed which comprises covering the surface of a polyester resin with cellophane or poly(vinyl alcohol) film, or of coating the surface of a polyester resin with a wax such as paraffin wax. The method of using film is troublesome because it is necessary to peel off the film after the curing and, also, it produces waste film. The method of employing wax requires polishing the surface of the cured product. Furthermore, these conventionally cured resins have the defects in that cracks and/or sinks appear when they are exposed to severe conditions, since they are generally inferior in chemical-resistance and weathering properties.

SUMMARY OF THE INVENTION

The main object of this invention is to provide a novel method of curing a curable material comprising an ethylenically unsaturated polyester composition and a substrate, and the resulting cured product. According to this invention, the above-mentioned defects are eliminated, and the physical and chemical properties such as resistance to chemicals and weathering are remarkably improved.

This invention comprises covering the surface of a substrate treated with an unsaturated polyester resin composition containing an ethylenically unsaturated monomer having at least one epoxy group with a saturated polyester film the surface of which has been activated, and curing the resin composition by conventional means, and if desired, followed by heating the cured product.

According to this invention, the properties of the cured product are markedly improved since the curing reaction advantageously proceeds and firm adhesion between the cured resin and the surface-covering polyester resin film is obtained. This invention can advantageously be applied to the process for preparing cured unsaturated polyester products such as FRP products, decorative plates, resin-coated plates, wood-polymer composites and the like. Any conventional substrate for these products can advantageously be employed in this invention.

The liquid ethylenically unsaturated polyester resins to be employed in this invention include a polymeric reaction product of a polycarboxylic acid and a polyol, at least some of which have ethylenically unsaturated double bonds. A substituted polycarboxylic acid or polyol can also be employed as the component of the polyester. Typical examples of the unsaturated polycarboxylic acid are maleic acid, fumaric acid, itaconic acid, citraconic acid and anhydrides thereof. Typical examples of the polyol are ethylene glycol and propylene glycol. The unsaturated polyester resin is preferably employed as a solution in a liquid copolymerizable monomer having at least one ethylenically unsaturated double bond. The copolymerizable monomers include styrene, vinyl acetate, vinyl toluene, chlorostyrene, divinyl benzene, a methacrylate, an acrylate, acrylonitrile, methacrylonitrile, diallyl phthalate, triallyl cyanurate and a mixture thereof. If desired, a solvent, a pigment, a dye or a filler can be added to the polyester resin.

In order to improve the adhesion between the cured polyester resin and the surface-covering polyester resin film, a copolymerizable ethylenically unsaturated monomer having at least one epoxy group in its molecule is added to the polyester resin. The copolymerizable monomers having an epoxy group include glycidyl methacrylate, allyl glycidyl ether, vinylhexane dioxide, styrene oxide and mixtures thereof. The amount of the copolymerizable monomer having an epoxy group to be added is generally about 0.05–30%, preferably about 0.1–20% by weight of a liquid unsaturated polyester resin or a solution of unsaturated polyester resin in a copolymerizable ethylenically unsaturated monomer.

The polyester film to be employed for the surface-covering comprises a film about 10–500 microns thick produced of a polymeric reaction product of a saturated polycarboxylic acid and a saturated polyol. A typical example of the film is a polyester resin comprising more than 50 mole % of poly(ethylene terephthalate) component. A laminate of the polyester resin film with another film or paper can also be employed. It is necessary to activate the surface of the polyester resin film before the covering by way of an activating means such as corona discharge treatment, chlorine gas treatment, alkali treatment, acid treatment, plasma jet treatment, flame treatment, irradiation with an ionizing radiation, graft polymerization with a copolymerizable monomer and the like.

DESCRIPTION OF THE PREFERRED EMBODIMENTS

Curing of the polyester resin composition can be effected by means of heating, irradiation with ionizing radiation and/or addition of curing agent. The ionizing radiations include an accelerated electron beam, proton beam, X rays, $\alpha$ rays, $\beta$ rays, $\gamma$ rays and the like. The curing agents include peroxides such as benzoyl peroxide, methyl ethyl ketone peroxide, cyclohexanon peroxide, cumene hydroperoxide, tert-butyl hydroperoxide, and redox polymerization initiators. The amount of these polymerization initiators (curing agents) to be employed is generally in the range of about 0.1–5% by weight of the polyester resin composition.

When curing is effected at room temperature or at a relatively low temperature, the cured product is further improved by heating it at about 80°–240°C for about 3–60 minutes. By the heating, adhesion between the cured product and the surface-covering polyester resin film is enhanced and the weathering and chemical-resistance properties are enhanced.

The dose and dose rate of the ionizing radiations to be employed are generally about $10^3$–$10^8$ rad and about $10^3$–$10^8$ rad/hour respectively.

In order to illustrate the invention further in detail, the working examples and controls are given below. It should be understood that change and modification within the scope and technical thoughts of the invention are allowed. In the examples, the amount, parts and percent are based on weight, unless otherwise specified.

EXAMPLE 1

Liquid unsaturated polyester resin comprising poly(propylene maleate phthalate) on the market was incorporated with 0.1 weight % of glycidyl methacrylate. The mixture was coated on a decorative plate. Then, the coated plate was covered with thin poly(ethylene terephthalate) film the surface of which had been activated by means of corona discharge. The coated and covered plate was irradiated with 10 Mrad electron beam from an electron accelerator at 500 KeV at room temperature to cure the coated resin composition. The cured plate was heated in 100°C oven for 30 minutes to produce a coated decorative plate in which the cured polyester resin and surface-covering polyester resin film were firmly bonded.

For the control, a comparative plate was prepared in the same way excepting that glycidyl methacrylate was not added. The results of chemical resistance test are shown in Table 1.

Table 1

| Treating agent | (Immersion test at room temperature) | | |
|---|---|---|---|
| | Conditions | Example | Control |
| Chloroform | 30 minutes | No change | The cured resin swelled |
| Acetone | 1 day | '' | '' |
| 10% NaOH solution | 7 days | '' | The cured resin swelled and whitened |

EXAMPLE 2

Liquid unsaturated polyester resin employed in Example 1 was incorporated with 1 weight % of benzoyl peroxide and 20 weight % of glycidyl methacrylate. Glass-fiber laminate was impregnated with the liquid mixture. Both sides of the impregnated laminate were covered with poly(ethylene terephthalate) films which had been activated with chromic acid mixture consisting of potassium bichromate, concentrated sulfuric acid and water. It was then heated at 80°C for 5 minutes, at 100°C for 5 minutes and at 150°C for 5 minutes, to produce a cured product in which the cured resin and surface-covering film were firmly bonded.

For the control, a comparative FRP laminate was prepared in the same way excepting that glycidyl methacrylate was not added. The results of weathering test by means of Weather-O-Meter were shown in Table 2.

Table 2

| Period of exposure | Example | Control |
|---|---|---|
| After 500 hrs. | No change | No change |
| After 1000 hrs. | '' | Glass fiber exposed. |
| After 2000 hrs. | '' | Glass fiber exposed and resin turned yellow. |
| After 3000 hrs. | '' | '' |

EXAMPLE 3

Liquid unsaturated polyester resin employed in Example 1 was incorporated with 5 weight % of glycidyl methacrylate. A thin wood plate was impregnated with the resin mixture. The impregnated wood was covered with poly(ethylene terephthalate) film which had been activated by graft-polymerizing acrylic acid at percent graft of about 3% by weight of the film, and then was irradiated with 1.5 Mrad gamma rays from Co-60, followed by heating it at 150°C for 5 minutes. A wood-polymer composite having excellent chemical-resistance and weathering properties and beautiful appearance was obtained. The cured resin and surface-covering film of the composite were firmly bonded.

What we claim is:

1. A process for preparation of a laminated article comprising:
    coating or impregnating a substrate with a composition consisting essentially of a liquid ethylenically unsaturated polyester resin and 0.5–30% by weight of an ethylenically unsaturated monomer having at least one epoxy group,
    covering said liquid ethylenically unsaturated polyester resin with a film of a saturated polyester resin whose surface facing said composition has been previously activated for promotion of adhesion; and
    curing said composition.

2. A process in accordance with claim 1, in which the liquid unsaturated polyester resin is a polymeric reaction product of a polycarboxylic acid and a polyol, at least some of which have ethylenically unsaturated double bonds.

3. A process in accordance with claim 2, in which the liquid unsaturated polyester resin is a mixture of said polymeric reaction product and a liquid copolymerizable monomer having at least one ethylenically unsaturated double bond.

4. A process in accordance with claim 1, in which the saturated polyester resin film is a polymeric reaction product of a saturated polycarboxylic acid and a saturated polyol.

5. A process in accordance with claim 1, in which the curing is effected by means of an ionizing radiation and then by heating.

6. A process for preparation of a laminated article in accordance with claim 1 wherein the surface of said film of a saturated polyester resin is previously activated for promotion of adhesion by the step of corona discharge treatment, chlorine gas treatment, alkali treatment, acid treatment, plasma jet treatment, flame treatment, irradiation with an ionizing radiation or graft polymerization with a copolymerizable monomer.

7. In a cured resin product comprising a polyester resin layer laminated on or impregnated in a substrate, and a covering film laminated on the surface of the resin layer, the improvement wherein:
    said polyester resin layer is prepared by curing a composition consisting essentially of a liquid ethylenically unsaturated polyester resin and 0.05–30% by weight of ethylenically unsaturated monomer having at least one epoxy group, said curing taking place on the substrate and after the placement of the covering film, and said covering film comprising a saturated polyester resin, the surface of which, facing the polyester resin layer, having been previously activated for promotion of adhesion.

8. A cured resin product in accordance with claim 7 wherein said curing is effected by means of an ionizing radiation.

9. A cured resin product in accordance with claim 7 wherein said surface of said polyester resin layer has been previously activated for promotion of adhesion by means of corona discharge treatment, chlorine gas treatment, alkali treatment, acid treatment, plasma jet treatment, flame treatment, irradiation with an ionizing radiation or graft polymerization with a copolymerizable monomer.

10. A cured resin product in accordance with claim 7, in which the liquid unsaturated polyester resin is a polymeric reaction product of a polycarboxylic acid and a polyol at least some of which has ethylenically unsaturated double bonds and the saturated polyester resin film is a polymeric reaction product of a saturated polycarboxylic acid and a saturated polyol.

11. A cured resin product in accordance with claim 10, in which the liquid unsaturated polyester resin is a mixture of said polymeric reaction product and a liquid copolymerizable monomer having at least one ethylenically unsaturated double bond.

* * * * *